(12) United States Patent
Behr et al.

(10) Patent No.: US 7,659,969 B2
(45) Date of Patent: Feb. 9, 2010

(54) DIAGNOSIS METHOD AND DIAGNOSIS CHIP FOR THE DETERMINATION OF THE BANDWIDTH OF OPTICAL FIBERS

(75) Inventors: Thorsten Behr, Detmold (DE); Andreas Pape, Brakel (DE)

(73) Assignee: Phoenix Contact GmbH & Co. KG (DE)

( * ) Notice: Subject to any disclaimer, the term of this patent is extended or adjusted under 35 U.S.C. 154(b) by 487 days.

(21) Appl. No.: 11/374,554

(22) Filed: Mar. 13, 2006

(65) Prior Publication Data
US 2007/0065148 A1  Mar. 22, 2007

(30) Foreign Application Priority Data
Mar. 14, 2005  (DE) ......................... 10 2005 011 954
Apr. 8, 2005  (DE) ......................... 10 2005 016 522

(51) Int. Cl.
*G01N 21/00* (2006.01)
*H04B 10/08* (2006.01)
*H04B 17/00* (2006.01)

(52) U.S. Cl. ........................... 356/73.1; 398/9; 398/25; 398/28

(58) Field of Classification Search ....................... None
See application file for complete search history.

(56) References Cited

U.S. PATENT DOCUMENTS

| | | | | |
|---|---|---|---|---|
| 4,280,765 A | * | 7/1981 | Pophillat et al. | 356/73.1 |
| 4,637,072 A | * | 1/1987 | Hellstrom | 398/29 |
| 4,921,347 A | * | 5/1990 | Wong et al. | 356/73.1 |
| 4,990,770 A | * | 2/1991 | Hemmann et al. | 250/227.24 |
| 5,196,899 A | * | 3/1993 | Serwatka | 356/73.1 |

(Continued)

FOREIGN PATENT DOCUMENTS

DE  42 17 899 C2  10/2001

(Continued)

OTHER PUBLICATIONS

SFF Committee "Specification for Diagnostic Monitoring Interface for Optical Xcvrs", SFF-8472, Rev 9.3, pp. 1-10 and 1-29, Aug. 1, 2002.*

(Continued)

*Primary Examiner*—Gregory J Toatley, Jr.
*Assistant Examiner*—Gordon J Stock, Jr.
(74) *Attorney, Agent, or Firm*—DeMont & Breyer, LLC

(57) ABSTRACT

For determination of the bandwidth of optical fibers, the invention proposes a method which comprises the injection of light at a first optical power level and at a first frequency into an optical fiber, as well as the measurement of a first signal level as a function of the optical power level of the light passing through the fiber at the first frequency, the injection of light at the second optical power level and at a second frequency into the optical fiber, the measurement of a second signal level as a function of the optical power level of the light passing through the fiber at the second frequency, and the determination of the bandwidth of the fiber as a function of the first and second optical power levels and/or of the measured first and second signal levels using a predetermined rule which describes the frequency-dependant attenuation response of the fiber.

32 Claims, 2 Drawing Sheets

U.S. PATENT DOCUMENTS

| | | | |
|---|---|---|---|
| 6,400,450 B1 * | 6/2002 | Golowich et al. | 356/73.1 |
| 6,504,849 B1 * | 1/2003 | Wang et al. | 370/455 |
| 6,801,306 B2 * | 10/2004 | Fontaine | 356/73.1 |
| 2003/0039211 A1 * | 2/2003 | Hvostov et al. | 370/230 |

FOREIGN PATENT DOCUMENTS

| | | |
|---|---|---|
| EP | 0140853 | 3/1987 |
| EP | 1 018 642 A1 | 7/2000 |
| JP | 60 070335 | 4/1985 |
| JP | 60 070335 A | 4/1985 |

OTHER PUBLICATIONS

Hans-Georg Unger, "Optische Nachrichtentechnik" Teil II: Komponenten, Systeme, MeBtechnik, 1992.

Ernst Bonek Ove, "How to Measure Transmission properties of optical fiber systems", Elektrotechnik und informationstechnik, Springer Verlag, Wien, Class 105, Booklet No. 10, Oct. 1, 1988, pp. 453-459, XP000026768, ISSN: 0932-383X.

* cited by examiner

DIAGNOSIS METHOD AND DIAGNOSIS CHIP FOR THE DETERMINATION OF THE BANDWIDTH OF OPTICAL FIBERS

FIELD OF THE INVENTION

The invention relates in general to optical data transmission and in particular to a method and an apparatus for diagnosis of optical fibers.

BACKGROUND OF THE INVENTION

Wiring systems based on optical cables are becoming of ever greater interest for backbone wiring systems and in conjunction with Fast Ethernet and Gigabit Ethernet. Signals are transmitted in optical fibers, which are also referred to as optical waveguides, uni-directionally by means of light pulses, that is to say in only one direction, for which reason at least two optical fibers are typically used per cable. The light pulses are generally injected into the fiber by means of a laser diode or a light-emitting diode.

The advantages of optical data transmission are the high achievable transmission rate and the long range, as well as the insensitivity to electromagnetic radiation, security against eavesdropping and resistance to heat and weather influences. Because the inner conductors are thin, optical cables can also be laid flexibly.

In addition to pure glass fibers, optical fibers composed of polymers have also been widely used, because their costs are lower. Optical fibers composed of polymers are referred to as POFs (Plastic Optical Fibers), and are pure plastic fibers which are composed of a transparent core and sheath, with the sheath having a lower refractive index than the core material. Polymers such as polymethylmethacrylate or polycarbonate are used as the core material. In addition to the purely polymer fibers, polymer optical fibers also include hybrid fibers which have a combination of glass fiber and plastic sheathing, for example HCS (Hard Polymer Cladded Silica) fibers.

The distance which can be bridged directly by optical waveguides is limited by various dispersion and scatter effects. The distance is a function of the bandwidth to be transmitted and is thus typically quoted as the bandwidth/length product. In comparison to glass fibers, polymer fibers such as POF or HCS have considerably higher attenuation levels. POF and HCS fiber systems are already reaching the limits of their technical capabilities when being operated over path lengths of 50 or 100 m and at data rates of 100 Mbit/s or 125 MBd. In order to ensure reliable data transmission, diagnosis of the optical fibers of the transmission path is now a conventional method.

One method for diagnosis of optical waveguide paths, in particular for optical diagnosis in the case of Interbus, is known for example from DE 42 17 899 C2. The method described there is used for system optimization of optical waveguide transmission paths during commissioning and provides for the optical transmission power level of a transceiver to be varied until the optical signal received at the opposite end corresponds to the system requirements.

EP 1 227 604 A2 discloses a method in which the instantaneous level margin with respect to the sensitivity limit, that is to say between the instantaneous transmission power of the transmitter and the instantaneous sensitivity limit of the receiver, is determined for an optical transmission path.

The aim of optical diagnosis according to the prior art is to diagnose attenuation of optical connecting paths in order to deduce whether transmission is reliable. This is actually adequate for low-bit-rate systems. However, at data rates above 100 Mbit/s, in the case of polymer (POF) and HCS fibers, the bandwidth of the cable becomes the limiting factor for error-free transmission, rather than the cable attenuation. However, this cannot be tested automatically by means of the methods that are now known. A further disadvantage of known systems is that the fiber type that is used, such as POF or HCS which can be operated on the same interface, cannot be determined automatically. This also has a disadvantageous effect on the attenuation diagnosis since different fiber types also have a different attenuation response, and the diagnosis data must therefore be assessed differently. Nowadays, the fiber type must typically be stated manually in the diagnosis software.

SUMMARY OF THE INVENTION

The invention is thus based on the object of finding a way in which the diagnosis of optical fibers and cables can be improved and/or simplified. In particular, the object of the invention is to specify a method and an apparatus for simple and cost-effective determination of the bandwidth of optical fibers. A further object of the invention is to find a means for system optimization of optical data transmission paths.

A method according to the invention for determination of the bandwidth of at least one optical fiber accordingly comprises the steps of injection of light at a first optical power level and at a first frequency into the optical fiber, measurement of a first signal level as a function of the optical power level of the light which is passing through the optical fiber and is at the first frequency, injection of light at a second optical power level and at a second frequency into the optical fiber, measurement of a second signal level as a function of the optical power level of the light which is passing through the optical fiber and is at the second frequency, and determination of the bandwidth of the optical fiber as a function of the injected first and second optical power levels and/or of the measured first and second signal levels using a predetermined rule which describes the frequency-dependent attenuation response of the optical fiber.

In this case, the first optical power level of the injected light at the first frequency and the second optical power level of the injected light at the second frequency advantageously have predetermined values which, in particular, are preferably essentially the same.

If the input power levels of the light injected at the first frequency and the second frequency are the same, a predetermined rule for description of the frequency-dependent attenuation response of the fiber can be used to determine the bandwidth from the ratio of the respective first and second signal levels measured for the output power levels.

Alternatively, the first optical power level of the injected light at the first frequency is advantageously varied until the measured first signal level reaches a predetermined first threshold value, and the second optical power level of the injected light at the second frequency is varied until the measured second signal level reaches a predetermined second threshold value. The first and second threshold values are, in particular, advantageously essentially the same.

The first threshold value for the first frequency and the second threshold value for the second frequency are advantageously the same, so that the bandwidth of the fiber can be determined easily from the respective optical input power levels, or from variables which are proportional to them.

The principle of the method according to the invention essentially provides for the attenuation of two optical signals at different frequencies to be determined, and for the bandwidth of the optical fiber to be determined from this on the basis of an already known characteristic frequency response of the attenuation of the optical fiber.

The expression attenuation means the losses in the light passing through an optical fiber. The attenuation is typically expressed as a logarithm to base 10 of the ratio of the optical power level at the input and output of the optical fiber:

$$A = 10 \cdot \log \frac{P_{Input}}{P_{output}} \, [\mathrm{dB}] \quad (1)$$

The attenuation is mainly caused by the physical processes of absorption and scatter, and by mechanical bending.

In the case of optical fibers which have a low-pass filter characteristic, the bandwidth corresponds to that modulation frequency at which the light power has fallen optically by 50% or 3 dB in comparison to the value at the frequency zero.

In order to improve the accuracy of the method, the signals at the first and second frequencies advantageously have highly different frequency-dependent attenuation.

For this purpose, it is advantageous for the first frequency to be lower, in particular by a factor of at least 10, and in particular by a factor of at least 100, than the bandwidth of the optical fiber. It is particularly advantageous for the frequency-dependent attenuation of the optical fiber at the first frequency to be essentially zero, since this precondition considerably simplifies the calculation rule for determination of bandwidth.

The second frequency is advantageously within the range of the bandwidth of the optical fiber. The second frequency can advantageously be within the range of the ideal bandwidth to be expected of the optical fiber, and thus typically above the real bandwidth.

The signal at the second frequency is thus attenuated to a greater extent than the signal at the first frequency. In particular, the optical fiber has a frequency-dependent attenuation for light passing through it at the second frequency which is between 1 and 5 dB, in particular between 2 and 4 dB, and in particular about 3 dB above the frequency-dependent attenuation for light passing through it at the first frequency.

The at least one optical fiber is preferably composed of a polymer and/or a glass and, in particular, is in the form of a POF or HCS fiber. Pure glass fibers are likewise covered by the scope of the invention, however.

One advantageous rule which describes the frequency-dependent attenuation response of an optical fiber, in particular of a POF or HCS fiber, is a Gaussian low-pass filter function which is defined by the equation $$P(f) = P_0 \cdot \exp\left(-\frac{f^2}{f_0^2}\right) \text{ where} \quad (2)$$

P(f): frequency-dependent power $P_0$: unattenuated power f: frequency $f_0$: attenuation parameter exp: exponential function.

It is particularly advantageous to measure the first and second signal levels using the OMA (Optical Modulated Amplitude) method by means of an optical transceiver which has a DMI (Diagnostic Monitoring Interface) in accordance with SFF-8472.

The DMI (Diagnostic Monitoring Interface) is an upgraded serial interface which allows access to specific operating parameters of an optical transceiver, for diagnosis purposes. These operating parameters include, for example the temperature of the transceiver, the output power level and, in particular, the optical power level received by the transceiver.

An optical transceiver can also advantageously be provided at the receiver end and can be used to detect only threshold values for a specific light power level, rather than determining the received optical power level directly. A transceiver such as this may be of simple design, and can thus be more cost-effective.

In the embodiment based on the detection of threshold values, the bandwidth is determined in virtually the same way as in the embodiment based on the accurate measurement of the received optical light power level. For this purpose, the optical transmission power level of the light at the first frequency and at the second frequency is varied as precisely as possible, while the reaching of a predetermined threshold value by the received optical light power level is monitored at the receiving end. In many cases, this can be implemented in a technically simpler manner than by carrying out an accurate light power measurement.

In order to determine the bandwidth, the light power level of the transmitter at the first frequency is adjusted until the predetermined first threshold value is reached in the receiver. The second frequency is then selected at the transmitter and is subject to a different frequency-dependent attenuation than the first frequency. The transmission power level must therefore be readjusted until the light power level at the receiver reaches the second threshold value, which preferably corresponds to the threshold value for the first frequency.

By way of example the current increase required at the transmitter in order to reach the same threshold value at the higher frequency as at the lower frequency allows a statement to be made about the frequency-dependent attenuation, provided that the relationship between the transmitter current and the light power level is known, so that the bandwidth can be calculated in an analogous manner to that in the embodiment based on the accurate measurement of the received light power level.

The described embodiment, based on influencing the transmission power level, is also simpler to implement technically since there is generally a fairly accurate linear relationship between the transmission power and the transmitted current in the case of LEDs and lasers, and it is technically simpler to accurately set currents in the range from about 1 to 100 mA than to measure light power levels at the receiver, since these measurements are typically based on the evaluation of diode currents in the region of μA or less.

The first and second signal levels are particularly preferably measured, for example, with the aid of the DMI interface of a transceiver for injected signals which have a continuous "10" bit pattern, by way of example as is available with the IDLE signal of a network such as 10Base-FL or 100Base-FX in which case the signal frequency of the injected signals is not the same for the two measurements.

The method according to the invention furthermore advantageously comprises the steps of determination of the length of the optical fiber by means of a delay-time measurement and determination of the bandwidth/length product of the optical fiber from the determined bandwidth and the determined length of the optical fiber.

The fiber type of the optical fiber can then be determined in a particularly advantageous manner as a function of the bandwidth/length product by means of stored value ranges of the bandwidth/length product for different fiber types.

The invention furthermore provides a method for setting up a link for data communication between a first and a second terminal, which are connected to one another by means of an optical data transmission path with at least one optical fiber, which method advantageously provides an initialization phase within which the bandwidth of the optical fiber is determined using the method as described above for determination of the bandwidth of an optical fiber.

The optical data transmission path advantageously comprises a first optical transceiver at the first path end and a second optical transceiver at the second path end, which are connected to one another via a first and a second optical fiber for the two transmission directions. For this arrangement, the method preferably provides for the bandwidth of the first and second optical fibers to be determined. The bandwidths of the first and second optical fibers can be determined successively or in parallel.

The determination of the bandwidth is used in particular for diagnosis of existing bandwidth limits which are influencing the maximum possible data transmission rate. The method accordingly advantageously provides the step of automatic matching of the transmission rate of the data communication as a function of the determined bandwidth of the at least one optical fiber.

An electronic component for use in an optical data transmission path which has at least one optical fiber, is in particular in the form of an integrated circuit, and is in particular designed to carry out the method described above for determination of the bandwidth of an optical fiber, according to the invention comprises means for calculation of a value for the bandwidth of an optical fiber as a function of a first and a second signal level using an algorithm which is based on a predetermined rule, with the rule describing the frequency-dependent attenuation response of the optical fiber.

The first and the second signal level is preferably proportional to a first and a second optical power level respectively, of light which is respectively injected into the optical fiber at a first or a second frequency, or is received after passing through the optical fiber.

The component can advantageously be integrated in an optical waveguide transceiver or in a PHY transceiver, in particular in an Ethernet-PHY transceiver which is associated with the physical layer of a network.

It is particularly advantageous for the component to be in the form of a separate diagnosis chip which is connected in the data path between a PHY transceiver which is associated with the physical layer of a network and an optical waveguide transceiver.

For this purpose, the component advantageously has not only an interface for connection to a PECL interface (PECL: Positive Emitter-Coupled Logic or Pseudo Emitter-Coupled Logic) of the optical transceiver but also an interface for connection to a PECL interface of the PHY transceiver.

Furthermore, the component preferably has a first serial interface for correction to a serial interface of the optical transceiver, and a second serial interface for connection to a serial interface of the PHY transceiver.

In the case of normal Ethernet communication, the component which is in the form of a separate diagnosis chip is transparent to the Ethernet data signals. In this case, however, the chip may, for example, be used to convert the DMI interface from $I^2C$ (Inter-Integrated Circuit) to, for example, SPI (Serial Peripheral Interface), since the latter interface is more likely to be used rather than an $I^2C$ interface for processors for FastEthernet. In a corresponding manner, the component advantageously comprises a converter for conversion of data between different transmission protocols, in particular, for conversion of data from $I^2C$ to SPI and/or from SPI to $I^2C$.

The component furthermore preferably comprises means for carrying out a delay-time measurement along the at least one optical fiber in order to determine the length of the optical fiber, and means for determination of the bandwidth/length product of the optical fiber from the determined bandwidth and the determined length of the optical fiber.

In the case of optical fibers, the maximum usable bandwidth is inversely proportional to the distance which can be bridged without signal regeneration. The product of the bandwidth and length thus forms a measure which is mainly dependent on the type of optical fiber being used.

The component therefore furthermore preferably comprises means which are suitable for determination of the fiber type of the optical fiber as a function of the bandwidth/length product. This is preferably carried out by means of value ranges of the bandwidth/length product, which are stored for at least two different fiber types.

BRIEF DESCRIPTION OF THE DRAWINGS

The invention will be described in more detail in the following text using preferred embodiments and with reference to the attached drawings. In this case, identical reference symbols in the drawings denote identical or similar parts.

In the figures.

DETAILED DESCRIPTION

Figure 1:
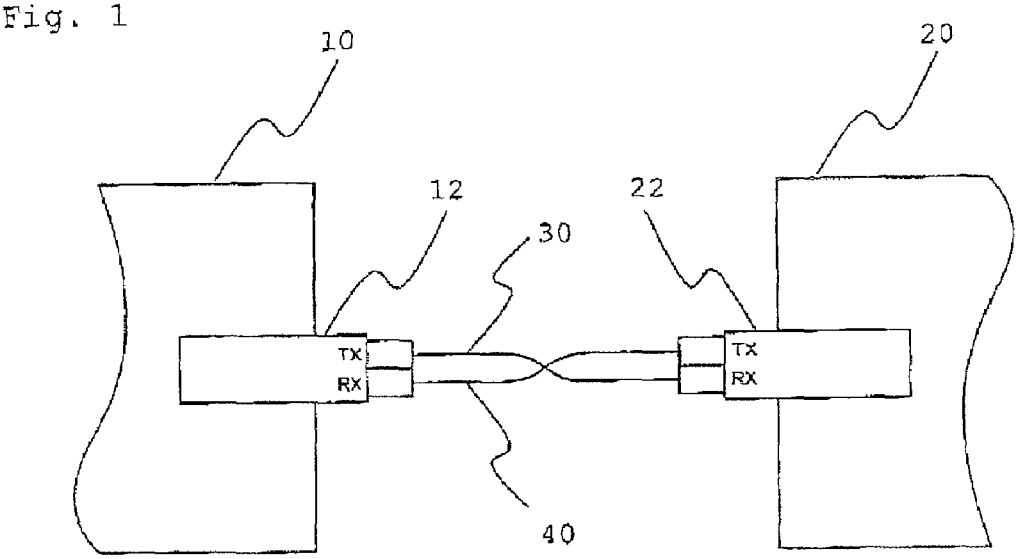
FIG. 1 shows, schematically, an optical transmission path with two optical transceivers which are connected to one another via two optical fibers.

FIG. 1 shows an optical data transmission path between a first terminal 10 and terminal 20. The respective terminals 10 and 20 are respectively equipped with a first optical transceiver 12 and a second optical transceiver 22, which are connected to one another via a duplex optical waveguide line with a first optical fiber 30 and a second optical fiber 40 for the two respective data directions.

In this exemplary embodiment, POF fibers are used as the optical fibers, and the bandwidth test according to the invention is carried out, before setting up the link, as initialization of the interfaces. The following text describes the fundamental procedure for determination of the bandwidth. First of all, the transceiver 12 sends a signal at a predetermined light power level and at a first frequency, which in this exemplary embodiment is typically below 10 MHz, and the transceiver 22 measures the OMA light power level of the received signal. The transceiver 12 then sends a signal at the same light power level but at a second frequency, which in this exemplary embodiment is typically between 60 and 100 MHz, and the transceiver 22 once again measures the OMA light power level of the received signal. The second fiber of the duplex optical waveguide line is measured in parallel in the same way, with the roles of the transceivers 12 and 22 being interchanged. The received light power of the second signal will be less than that of the first signal depending on the cable length, the light injected (injection NA) into the fiber and, possibly, diffraction or damage to the fiber. If this difference is greater than 3 dB for a FastEthernet system, then it must be expected that bandwidth limits will occur as a result of transmission interference. In this case, an appropriate warning message can be generated, or the data transmission rate can be adjusted automatically.

As an alternative to accurate measurement of the received light power level, it is also possible, as described above, to vary the transmission power at a first frequency and at a second frequency until a predetermined threshold value for the received light power level is detected at the receiving end.

Furthermore, the path length of the optical transmission path between the terminals 10 and 20 can be determined by means of a delay-time measurement, in the case of Profinet, for example, by means of the delay-time measurement for clock synchronization. In addition, the determined bandwidth can thus subsequently be related to the cable length, and can be evaluated. Automatic determination of the fiber type is thus possible, since, for example, a POF fiber has a different bandwidth/length product to that of a HCS fiber.

The method according to the invention can also be used for Gbit transceivers and multimode glass fibers (50/135 µm, 62.5/125 µm), since, in this situation as well, the possible transmission distance between two transceivers is bandwidth-limited. In this case, the frequencies must be matched to the conditions in the glass fibers.

Figure 2:
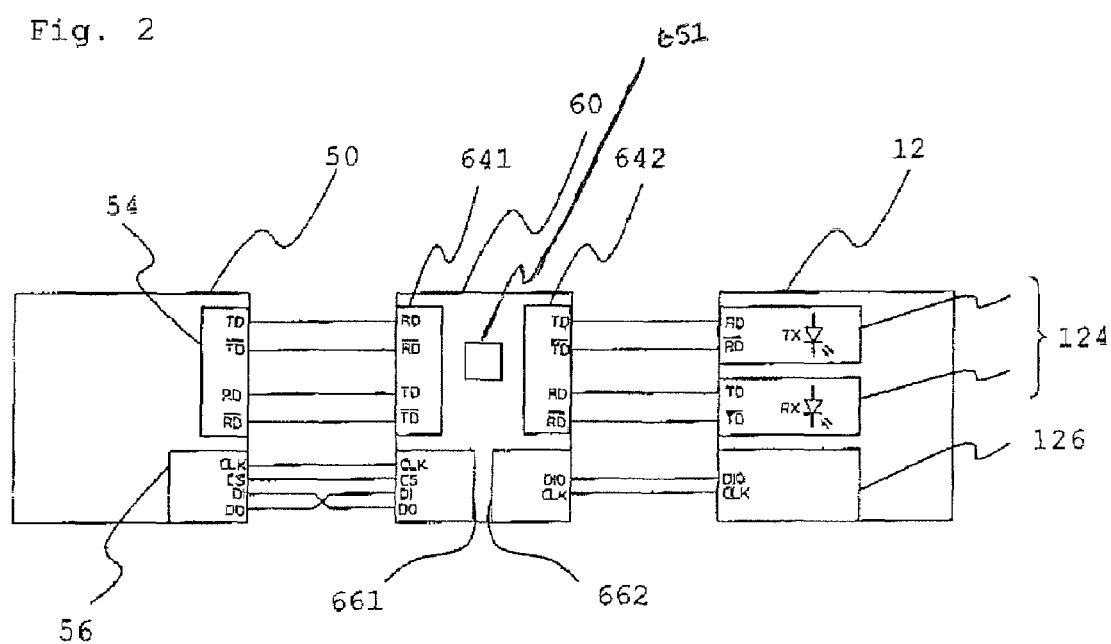
FIG. 2 shows a schematic illustration of one preferred embodiment of an electronic component according to the invention.

FIG. 2 shows a schematic illustration of one preferred embodiment of an electronic component 60 according to the invention, which is in the form of a separate diagnosis chip. The diagnosis chip 60 is connected in the data path between a PHY transceiver 50 which is associated with the physical layer of a network, and an optical waveguide transceiver 12. First and second interfaces 641 and 642 are provided for data communication purposes in the component 60, via which the PECL interface 124 of the optical waveguide transceiver 12 is connected to the PECL interface 54 of the PHY transceiver 50. The component 60, which is in the form of a separate diagnosis chip, is thus transparent to the Ethernet data signals in the case of normal Ethernet communications.

Particularly in order to check the received light power level, the component 60 furthermore comprises a first serial interface 662 for connection to a DMI interface 126 of the optical transceiver 12. Furthermore, a second serial interface 661 is provided for connection to a serial interface 56 of the PHY transceiver 50.

In this exemplary embodiment, the interfaces 126 and 662 use the I²C transmission protocol, and the interfaces 56 and 661 use the SPI transmission protocol. Converter 651 is integrated in the component 60 in order to convert between these two transmission protocols.

The invention can be used advantageously in all optical interfaces for FastEthernet appliances with POF and HCS fiber interfaces, as well as for glass fiber interfaces, which are of particular interest for systems with data transmission rates of 10 Gbit/s.

Particularly in the case of Profinet interfaces, the method offers additional advantages over conventional diagnosis systems, since it is not based directly on the optical waveguide transceiver that is used but is a digital method. The only precondition is that the optical waveguide transceiver that is used has a DMI interface in accordance with SFF-8472 and measures the AC component of the light power level using the OMA (Optical Modulated Amplitude) method described there.

As has already been described above, the method is in principle based on the idea, for example, of the DMI interface of an optical transceiver being used to carry out two attenuation measurements at two different frequencies. The signals at different frequencies can be represented in a particularly simple manner by a continuous "10" bit pattern at an appropriate frequency. The IDLE signal of a network can be used particularly advantageously for this purpose.

One specific example of determination of a bandwidth will be described in the following text with reference to FIG. 3. The signals at the first and second frequencies are in this case formed by means of an IDLE signal in accordance with 10Base-FL for the first frequency and by means of an IDLE signal in accordance with 100Base-FX for the second frequency. The IDLE signal in accordance with 10Base-FL is at a frequency of 0.5 MHz, which results from alternating "light on" and "light off" signals with a duration of 1 µs each. The IDLE signal in accordance with 100Base-FX is at a frequency of 62.5 MHz, which results from the data rate of 100 Mbit/s, with 4 B/5 B coding and one change in the NRZI code per bit period of the IDLE signal.

The first measurement is accordingly carried out at a frequency of 0.5 MHz, which is well below the bandwidth 84 of the POF fiber of about 90 MHz that is used in this exemplary embodiment. For this purpose, the transmitter in the first transceiver is stimulated at this frequency and the averaged light power level arriving at the receiver of the second transceiver via its DMI interface is determined. No frequency-dependent attenuation takes place at this frequency, and the received light power is at the level denoted by the reference symbol 72 in FIG. 3.

Figure 3:
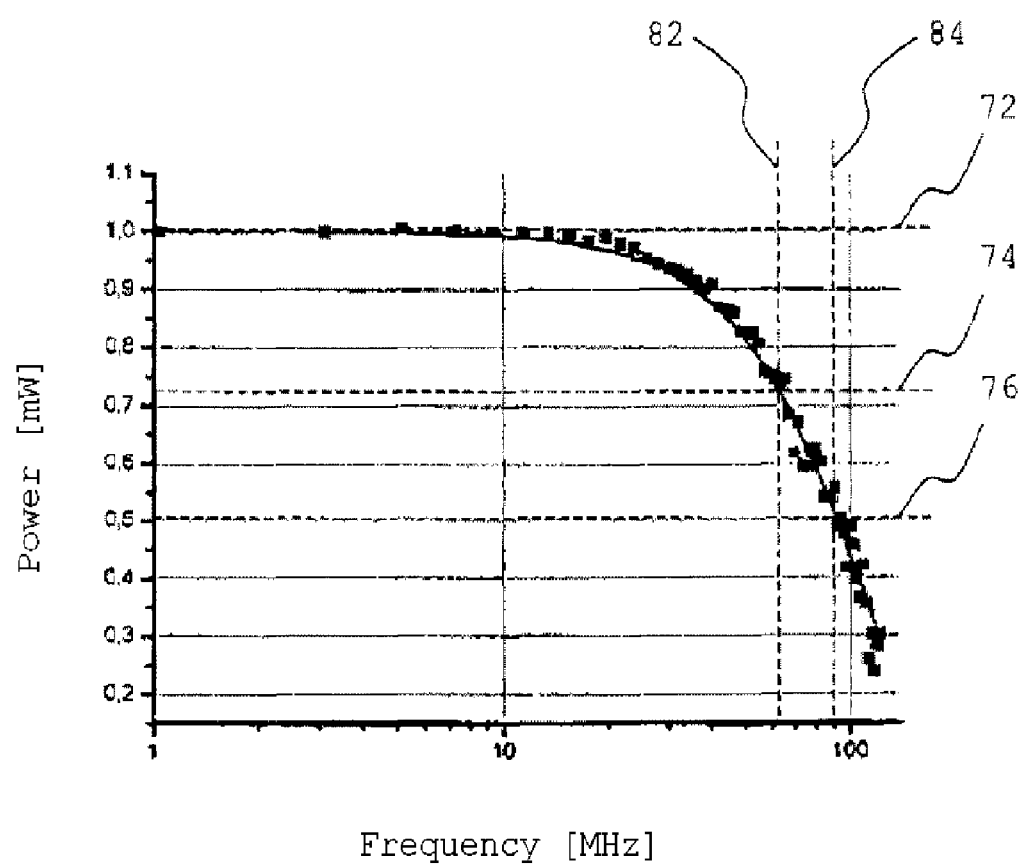
FIG. 3 shows a schematic diagram of the frequency-dependent attenuation response of a POF fiber.

A second measurement is then carried out at the frequency 62.5 MHz, annotated with the reference symbol 82 in FIG. 3 which is in the order of magnitude of the bandwidth 84 of 90 MHz of the fiber to be measured, at which the received light power 76 has fallen by half in comparison to the frequency zero.

Owing to the low-pass filter characteristic of the fiber, this second determined light power level 74 is less than the first 72. According to the invention, it is now possible to deduce the bandwidth of the link from the known low-pass filter characteristic of the optical waveguide fiber being used, and to deduce the fiber type as well, by means of an automatic path length measurement.

A Gaussian low-pass filter function based on the equation $$P(f) = P_0 \cdot \exp\left(-\frac{f^2}{f_0^2}\right), \text{ where} \qquad (2)$$

P(f): frequency-dependent power
$P_0$: unattenuated power
f: frequency
$f_0$: attenuation parameter
exp: exponential function, is for this purpose used as the rule which describes the frequency-dependent attenuation response of the fiber.

In this exemplary embodiment, the received light power is measured as an electrical signal level via the DMI interface, resulting in the following measured values:

$$U(0.5 \text{ MHz}) = 452 \text{ mV} = U_0$$

$$U(62.5 \text{ MHz}) = 324 \text{ mV}$$

$$\Rightarrow \frac{U}{U_0} = 0.72$$

Since the signal level determined using the OMA method and produced by the DMI interface is proportional to the received light power, the above equation (2) results in:

$$U(f) = U_0 \exp\frac{f^2}{f_0^2}, \text{ where} \qquad (3)$$

U(f): frequency-dependent electrical signal level
$U_0$: U(0.5 MHz)
f: frequency
$f_0$: attenuation parameter
exp: exponential function, and $$\Rightarrow f_0 = \sqrt{-\frac{(62.5 \text{ MHz})^2}{\ln\left(\frac{U}{U_c}\right)}} = 109.05 \text{ MHz}, \text{ where} \qquad (4)$$

$f_0$: attenuation parameter
U: electrical signal level at 62.5 MHz
$U_0$: electrical signal level at 0.5 MHz
ln: natural logarithm.

The bandwidth of the optical fiber can now be calculated from this to be:

$f_{3dB} = \sqrt{-\ln(0.5)} \cdot f_0 = 90.8$ MHz, where $f_{3dB}$: bandwidth ln: natural logarithm $f_0$: attenuation parameter.

The bandwidth of the optical fiber when the transmission power is varied until the received optical power reaches a predetermined threshold value, with the threshold value being the same for both frequencies, can be calculated in an analogous manner.

For this variant:

$$f_0 = \sqrt{-\frac{(f_2)^2}{\ln\left(\frac{P_{0;f_1}}{P_{0;f_2}}\right)}} = \sqrt{-\frac{(62.5\ \text{MHz})^2}{\ln\left(\frac{P_{0;0.5MHz}}{P_{0;62.5MHz}}\right)}} \quad (5)$$

where $P_{0;f_1}$: Optical transmission power to reach the threshold value of the first frequency, and $P_{0;f_2}$: Optical transmission power to reach the threshold value of the second frequency.

If there is a linear relationship between the transmitter current I of the LED which is used for transmission or of the laser which is used for transmission and the injected light power, then:

$$f_0 = \sqrt{-\frac{(f_2)^2}{\ln\left(\frac{I_{0;f_1}}{I_{0;f_2}}\right)}} \quad (6)$$

where $I_{0;f_1}$: Transmitter current to reach the threshold value of the first frequency, and $I_{0;f_2}$: Transmitter current to reach the threshold value of the second frequency.

What is claimed is:

1. A method for determination of the bandwidth of at least one optical fiber from attenuation of two optical signals at two frequencies, the method comprising:

injecting light at a first optical power level and at a first frequency of the two frequencies into the at least one optical fiber;

measuring a first signal level as a function of the optical power level of the light which is passing through the at least one optical fiber and is at the first frequency;

injecting light at a second optical power level and at a second frequency of the two frequencies into the at least one optical fiber, wherein the second frequency is different than the first frequency;

measuring a second signal level as a function of the optical power level of the light which is passing through the at least one optical fiber and is at the second frequency; and determining the bandwidth of the at least one optical fiber as a function of the first and second optical power levels and/or of the measured first and second signal levels using a predetermined rule which describes a frequency-dependent attenuation response of the at least one optical fiber.

2. The method as claimed in claim 1, wherein
   the first optical power level of the injected light at the first frequency and the second optical power level of the injected light at the second frequency have predetermined values.

3. The method as claimed in claim 1, wherein the first optical power level of the injected light at the first frequency and the second optical power level of the injected light at the second frequency are essentially the same.

4. The method as claimed in claim 1, further comprising
   determining a first attenuation of the at least one optical fiber for light passing through it at the first frequency, and
   determining a second attenuation of the at least one optical fiber for light passing through it at the second frequency.

5. The method as claimed in claim 1, wherein the predetermined rule which describes the frequency-dependent attenuation response of the at least one optical fiber is a Gaussian low-pass filter function.

6. The method as claimed in claim 1, wherein the at least one optical fiber is composed of a polymer and/or a glass.

7. The method as claimed in claim 1, wherein the first frequency is lower than the bandwidth of the at least one optical fiber.

8. The method as claimed in claim 1, wherein the frequency-dependent attenuation of the at least one optical fiber at the first frequency is essentially zero.

9. The method as claimed in claim 1, wherein the second frequency is approximately in the bandwidth of the at least one optical fiber.

10. The method as claimed in claim 1, wherein the second frequency is above the bandwidth the at least one optical fiber.

11. The method as claimed in claim 1, wherein the at least one optical fiber has a frequency-dependent attenuation for light passing through it at the second frequency which is between 1 and 5 dB above a frequency-dependent attenuation for light passing through it at the first frequency.

12. The method as claimed in claim 1, wherein the first and second signals are measured using an OMA (Optical Modulated Amplitude) method via an optical transceiver which has a DMI (Diagnostic Monitoring Interface) in accordance with SFF-8472.

13. The method as claimed in claim 1, wherein
   the first optical power level of the injected light at the first frequency is varied until the measured first signal level reaches a predetermined first threshold value, and
   the second optical power level of the injected light at the second frequency is varied until the measured second signal level reaches a predetermined second threshold value.

14. The method as claimed in claim 1, wherein the light passing through the at least one optical fiber at the first and/or second frequency comprises a data signal which has bit values 1 and 0 alternately.

15. The method as claimed in claim 1, further comprising:
   determining the length of the at least one optical fiber via a delay-time measurement, and
   determining the bandwidth/length product of the at least one optical fiber from the determined bandwidth and the determined length of the at least one optical fiber.

16. The method as claimed in claim 13, wherein the first and the second threshold values are essentially the same.

17. The method as claimed in claim 14, wherein the data signal is an IDLE signal in accordance with a network standard.

18. The method as claimed in claim 15, further comprising:
determining the fiber type of the at least one optical fiber as a function of the bandwidth/length product via stored value ranges of the bandwidth/length product for at least two different fiber types.

19. A method for setting up a link for data communication between a first and a second terminal, which are connected to one another via an optical data transmission path having at least one optical fiber, the method comprising:
initializing the link, the initializing comprising a determination of the bandwidth of the at least one optical fiber from attenuation of two optical signals at two frequencies, the determination comprising the following steps:
injecting light at a first optical power level and at a first frequency of the two frequencies into the at least one optical fiber;
measuring a first signal level as a function of the optical power level of the light which is passing through the at least one optical fiber and is at the first frequency;
injecting light at a second optical power level and at a second frequency of the two frequencies into the at least one optical fiber, wherein the second frequency is different than the first frequency;
measuring a second signal level as a function of the optical power level of the light which is passing through the at least one optical fiber and is at the second frequency; and
determining the bandwidth of the at least one optical fiber as a function of the first and second optical power levels and/or of the measured first and second signal levels using a predetermined rule which describes a frequency-dependent attenuation response of the at least one optical fiber.

20. The method as claimed in claim 19, wherein the initializing further comprises automatically matching the transmission rate of the data communication as a function of the determined bandwidth of the at least one optical fiber.

21. The method as claimed in claim 19, wherein the optical data transmission path comprises a first optical transceiver at a first path end and a second optical transceiver at a second path end, which are connected to one another via a first and a second optical fiber for two transmission directions, and wherein the bandwidth of the first and of the second optical fiber is determined.

22. The method as claimed in claim 21, wherein the bandwidths of the first and of the second optical fiber are determined successively.

23. The method as claimed in claim 21, wherein the bandwidths of the first and of the second optical fibers are determined essentially at the same time.

24. An electronic component for use in an optical data transmission path, the component being adapted for calculating a value for the bandwidth of an optical fiber as a function of two signal levels using an algorithm which is based on a predetermined rule, with the rule describing a frequency-dependent attenuation response of the optical fiber, wherein a first signal level of said two signals is proportional to a first optical power level of light at a first frequency and a second signal level of said two signals is proportional to a second optical power level of light at a second frequency that is different than the first frequency.

25. The component as claimed in claim 24, which is integrated in an optical waveguide transceiver.

26. The component as claimed in claim 24, which is integrated in a PHY transceiver which is associated with a physical layer of a network.

27. The component as claimed in claim 24, wherein the component is also adapted for i) carrying out a delay-time measurement along the optical fiber in order to determine the length of the optical fiber, and ii) determining the bandwidth/length product of the optical fiber from the determined bandwidth and the determined length of the optical fiber.

28. The component as claimed in claim 24, wherein the component is also adapted for determining the fiber type of the optical fiber as a function of the bandwidth/length product via stored value ranges of the bandwidth/length product for at least two different fiber types.

29. The component as claimed in claim 24, which is connected between an optical waveguide transceiver and a PHY transceiver which is associated with a physical layer of a network.

30. The component as claimed in claim 29, comprising an interface for connection to a PECL interface of the optical transceiver, and an interface for connection to a PECL interface of the PHY transceiver.

31. The component as claimed in claim 29, comprising a first serial interface for connection to a serial interface of the optical transceiver, and a second serial interface for connection to a serial interface of the PHY transceiver.

32. The component as claimed in claim 31, comprising a converter for conversion of data between different transmission protocols.

* * * * *

UNITED STATES PATENT AND TRADEMARK OFFICE
CERTIFICATE OF CORRECTION

PATENT NO. : 7,659,969 B2 Page 1 of 1
APPLICATION NO. : 11/374554
DATED : February 9, 2010
INVENTOR(S) : Behr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 820 days.

Signed and Sealed this

Thirtieth Day of November, 2010

David J. Kappos
*Director of the United States Patent and Trademark Office*